United States Patent [19]

Hazan

[11] Patent Number: 5,413,809
[45] Date of Patent: May 9, 1995

US005413809A

[54] METHOD FOR ACHIEVING RECOAT ADHESION OVER A SILANE TOPCOAT

[75] Inventor: Isidor Hazan, Clementon, N.J.

[73] Assignee: E. I. du Pont de Nemours and Company, Wilmington, Del.

[21] Appl. No.: 86,781

[22] Filed: Jul. 1, 1993

[51] Int. Cl.⁶ .................... B32B 35/00; B05C 13/00; B05D 3/02; B05D 1/36
[52] U.S. Cl. .................... 427/140; 427/142; 427/387; 427/407.1; 427/409; 427/412.1
[58] Field of Search ............ 427/140, 142, 387, 407.1, 427/409, 412.1

[56] References Cited

U.S. PATENT DOCUMENTS

| | | | |
|---|---|---|---|
| 4,043,953 | 8/1977 | Chang et al. | 260/18 S |
| 4,368,297 | 1/1983 | Kato et al. | 525/342 |
| 4,518,726 | 5/1985 | Kato et al. | 524/32 |
| 5,225,248 | 7/1993 | Stephenson | 427/333 |

FOREIGN PATENT DOCUMENTS

63-33512  5/1988  Japan .

*Primary Examiner*—Paul R. Michl
*Assistant Examiner*—Patrick Niland

[57] ABSTRACT

A method for repairing a basecoat/topcoat finish or coating comprised of a silane topcoat. A silane curing catalyst is added to the repair basecoat composition to improve recoat adhesion.

13 Claims, No Drawings

METHOD FOR ACHIEVING RECOAT ADHESION OVER A SILANE TOPCOAT

BACKGROUND OF THE INVENTION

This invention is directed to a method for recoating a substrate with a basecoat/topcoat system in which the topcoat composition comprises a silane polymer. In particular, this invention is directed to a method for obtaining recoat adhesion, especially during in-line and end-of-line repair of the finish of an automobile or truck during their original manufacture.

In order to protect and preserve the aesthetic qualities of the finish on an automobile or other vehicle, it is generally known to provide a clear (unpigmented or slightly pigmented) topcoat over a colored (pigmented) basecoat, so that the basecoat remains unaffected even on prolonged exposure to the environment or weathering. This is referred to as a topcoat/basecoat finish. It is also generally known that silane polymers provide coatings having improved chemical or etch resistance. Exemplary of prior art patents disclosing silane polymers for coating are U.S. Pat. No. 4,368,297; U.S. Pat. No. 4,518,726; U.S. Pat. No. 4,043,953; and Japanese Kokai 57-12058.

Commercialization of silane finishes have been hindered by several significant or even critical technical hurdles. For example, a commercially practical finish, among other requirements, must have adequate recoat adhesion, since defects in the finish may occasionally occur during the original manufacturing process, necessitating on-site repair. A commercially practical finish must not be problematic or difficult to apply.

SUMMARY OF THE INVENTION

In conventional in-line or end-of-line repair of an automobile finish, a repair basecoat/clearcoat system is applied over a previously cured, but defective original basecoat/clearcoat. The total finish is then subjected to another cure cycle. Sanding or removal of the defective finish is normally omitted. The repair (second) basecoat is expected to adhere to the original (first) clearcoat at normal cure conditions.

During the development of etch resistant silane topcoat compositions, applicants found that conventional repair basecoats showed poor or inadequate adhesion to the cured topcoat. This poor adhesion is believed due to the phenomenon of silicon stratification at the outside surface (the side in contact with air) of the clearcoat. While such stratification is generally desirable, since it contributes to etch resistance, nevertheless such stratification appears to also have an adverse effect on what is known in the art as recoat adhesion. Applicants were able to solve this problem of recoat adhesion by including a cure catalyst, which is normally used for curing the silane topcoat, in the repair basecoat.

The claimed method is directed to a method for repairing an original basecoat/topcoat finish in which the original topcoat comprises a cured silane polymer. The repair method comprises:

(a) applying a basecoat composition, comprising a silane cure catalyst, to a substrate having a coating comprising a substantially cured silane polymer;

(b) applying a topcoat composition comprising a silane polymer; and (c) curing the new basecoat/topcoat finish.

By the term substantially cured or partially cured is meant that, although at least some curing has occurred, further curing may occur over time. In a preferred embodiment, the repair and original basecoat compositions are the same and the original and repair topcoat or clearcoat compositions are the same. The topcoat composition suitably comprises from about 50 to 75% by weight of binder, and the binder comprises 10 to 90% by weight, preferably 20 to 60%, of a silane polymer. Preferably, the silane polymer is the polymerization product of a mixture of monomers of which about 5 to 70%, preferably 30 to 60% are ethylenically unsaturated monomers which contain a silane functionality.

The claimed invention further includes a basecoat composition usable in the present method and a coated substrate prepared according to the present method.

The method of the present invention is especially useful for forming a clear silane topcoat over a pigmented basecoat. Such a topcoat can be applied over a variety of basecoats, including basecoats containing water or organic solvent and powder basecoats.

DETAILED DESCRIPTION OF THE INVENTION

As indicated above, this invention relates to the application of etch resistant coatings involving silane chemistry. More particularly, this invention provides a method for obtaining recoat adhesion when repairing a finish having a topcoat comprising a cured or at least partially cured silane polymer. The method is especially useful for in-line and end-of-line repair of an original finish on the exterior of automobile and truck bodies or parts thereof. This method involves applying a repair basecoat which contains a curing catalyst of the kind employed in the silane topcoat composition originally applied.

Typically, an automobile steel panel or substrate is first coated with an inorganic rust-proofing zinc or iron phosphate layer over which is provided a primer which can be an electrocoated primer or a repair primer. A typical electrocoated primer comprises a cathodically deposited epoxy modified resin. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied. A typical basecoat comprises a pigment, which may include metallic flakes in the case of a metallic finish, and a polyester or acrylourethane film-forming binder.

A clear topcoat (clearcoat) may then be applied to the pigmented basecoat (colorcoat). The colorcoat and clearcoat are preferably deposited to have thicknesses of about 0.1–2.5 mils and 1.0–3.0 mils, respectively. In the present invention, the topcoat comprises an organosilane polymer.

As indicated above, according to the present invention, for the purpose of repairing an original basecoat/clearcoat, the repair basecoat is formulated to contain a catalyst such as used to cure the original silane clearcoat. A plurality or mixture of such cure catalysts can be employed. Although such catalysts can be different in the basecoat and topcoat compositions, it is generally more convenient that they be the same.

The basecoat is neither adversely affected not effectively cured by the inclusion therein of a curing catalyst of the kind used to cure the silane topcoat. Preferably, the film-forming polymers to be cross-linked in the basecoat are all non-silane containing, although small amounts of silane containing polymers or compounds may be present. The basecoat is not effectively cured by catalysts, such as tin chelates, which are employed to catalyze the silane-containing polymers in the topcoat. For example, a basecoat having an alkylated melamine-formaldehyde resin crosslinker is typically catalyzed by strong acid catalysts.

By the term "non-silane-containing" is meant that the film-forming polymers in the binder of the composition for the basecoat do not contain alkoxysilane, silanol, and/or acetoxysilane groups, or like reactive silicon-containing groups, the reaction of which causes curing. However, although the film-forming portion of the binder is mostly or essentially, if not completely, non-silane containing, a small amount of acrylosilane resin, siloxane, and/or silane coupling agent, in the amount of 0–20% by weight of binder, preferably 0–10%, may be used in the basecoat. The term "primarily non-silane containing basecoat" is intended to mean that the basecoat is effectively cured by other than a silane curing catalyst, but that small amounts of silane groups may be present.

In commercial application of the present invention, it is most convenient to use the same coating compositions for both the original finishes and the repair finishes, so that only one topcoat and basecoat composition are necessary. Another advantage is that, for in-line repair, the same delivery lines and production cycle can be used for the original compositions and the repair compositions. Hence, the basecoat composition used in the original finish will contain silane curing catalyst even though it has may have no effect on the recoat adhesion. The use of silane cure catalysts in the original basecoat may have certain advantages, not relating to recoat adhesion, as disclosed in commonly assigned copending U.S. application Ser. No. 639,345, hereby incorporated by reference in its entirety.

The topcoat composition employed in the present invention comprises, as a film-forming polymer, an organosilane polymer, herein also referred to as a silane polymer. Suitable silane polymers have a weight average molecular weight of about 1000–30,000. All molecular weights disclosed herein are determined by gel permeation chromatography using a polystyrene standard, unless otherwise noted.

A wide variety of organosilane polymers which contain curable silane groups may be employed in the present invention. However, a preferred silane polymer is the polymerization product of, by weight, about 30–95%, preferably 70–40% ethylenically unsaturated non-silane containing monomers and about 5–70%, preferably 30–60% ethylenically unsaturated silane containing monomers, based on the weight of the silane polymer. An acrylosilane resin having 52% by weight silane monomer has been found to have good recoat adhesion and mar resistance. Suitable ethylenically unsaturated non-silane containing monomers are alkyl acrylates, alkyl methacrylates and any mixtures thereof, where the alkyl groups have 1–12 carbon atoms, preferably 3–8 carbon atoms.

Suitable alkyl methacrylate monomers used to form an organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane-containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight. For further improvement is recoat adhesion, hydroxy functional monomers may be incorporated into the organosilane polymer to produce a polymer having a hydroxy number of 20 to 160. weight to.

A suitable silane containing monomer useful in forming an acrylosilane polymer is an alkoxysilane having the following structural formula:

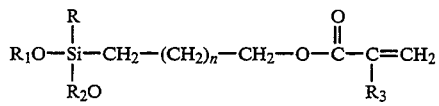

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gammaacryloxypropyltrimethoxy silane and the methacrylatoalkoxy silanes, such as gammamethacryloxypropyltrimethoxy silane, and gamma-methacryloxypropyltris(2-methoxyethoxy) silane.

Other suitable alkoxy silane monomers have the following structural formula:

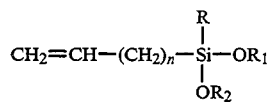

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of the above-mentioned silane-containing monomers are also suitable.

Consistent with the above mentioned components of the silane polymer, an example of an organosilane polymer useful in the coating composition of this invention may contain the following constituents: about 15–25% by weight styrene, about 30–60% by weight methacryloxypropyltrimethoxy silane, and about 25–50% by weight trimethylcyclohexyl methacrylate.

One preferred acrylosilane polymer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

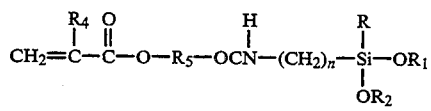

wherein R, $R_1$, and $R_2$ are as described above; $R_4$ is H or $CH_3$, $R_5$ is an alkylene group having 1–8 carbon atoms and n is a positive integer from 1–8.

Curing catalysts for catalyzing the crosslinking between silane moieties of the silane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catayzing silane bonding. Other silane curing catalysts are disclosed in U.S. Pat. No. 4,923,945, column 15 to column 17, herein incorporated by reference.

In another embodiment, the coating composition employed as a topcoat in the present invention may include, particularly in conjunction with an optional polyol polymer, an additional crosslinking agent, for example a conventionally known monomeric or polymeric alkylated melamine formaldehyde resin that is partially or fully alkylated. One preferred crosslinking agent is a methylated and butylated or isobutylated melamine formaldehyde resin that has a degree of polymerization of about 1–3. Generally, this melamine formaldehyde resin contains about 50% butylated groups or isobutylated groups and 50% methylated groups. Such crosslinking agents typically have a number average molecular weight of about 300–600 and a weight average molecular weight of about 500–1500. Examples of commercially available resins are "Cymel" 1168, "Cymel" 1161, "Cymel" 1158, "Resimine" 4514 and "Resimine" 354. Preferably, the crosslinking agent is used in the amount of about 5–50% by weight, preferably about 8–10%, based on the weight of the binder of the composition. Other crosslinking agents are urea formaldehyde, benzoquanamine formaldeyde and blocked polyisocyanates.

In addition to the above polymeric components, a dispersed polymer may be used in combination with an organosilane polymer in the topcoat composition. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; and 4,591,533, hereby incorporated by reference. In general, a dispersed polymer is characterized as a polymer particle dispersed in an organic media, which particle is stabilized by what is known as steric stabilization. According to the prior art, steric stabilization is accomplished by the attachment of a solvated polymeric or oligomeric layer at the particle-medium interface. Suitable dispersed polymers for use in conjuction with silane polymers are disclosed in copending commonly assigned U.S. application Ser. No. 07/627,997, hereby incorporated by reference in its entirety. Preferably, about 20% by weight of such a dispersed polymer is included to prevent cracking.

To improve the weatherability of the clear finish made with the topcoat composition, an ultraviolet light stabilizer or a combination of ultraviolet light stabilizers can be added to the topcoat composition in the amount of about 0.1–10% by weight, based on the weight of the binder. Such stabilizers include ultraviolet light absorbers, screeners, quenchers, and specific hindered amine light stabilizers. Also, an antioxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend by weight of binder of about 2% of TIN 900 (UV screener) and 1.5% TIN 123 (hindered amine), both commercially available from Ciba-Geigy, is preferred.

A suitable amount of water scavenger such as trimethyl orthoacetate(preferably 2 to 6% by weight of binder) is typically added to the topcoat composition for extending its pot life. About 3% microgel and 1 hydrophobic silica may be employed for rheology control.

Small amounts of pigment can be added to the clear coat to eliminate undesirable color in the finish such as yellowing.

In the repair basecoat employed in the present invention, a suitable amount of silane curing catalyst is about 0.1 to 2%, most preferably 0.2% to 0.8%, based on the weight of the binder in the basecoat. A suitable amount of silane curing catalyst in the repair topcoat is suitably 0 to 1%, preferably 0 to 0.5% by weight of binder in the topcoat.

According to the present method, when the repair topcoat is applied over the repair basecoat, at least a portion of the silane curing catalyst in the basecoat may diffuse or migrate from the basecoat into the topcoat, thereby contributing to the curing of the topcoat. Upon baking or curing of the basecoat and topcoat together, the curing catalyst effects crosslinking in the topcoat, between silane groups on different polymers, between silane groups on the same polymer, between silane groups and other crosslinking groups on other polymers and/or crosslinking agents that may be present in the particular composition.

In the typical case, the basecoat employed in the present invention may involve crosslink chemistry, for example ether formation, promoted by strong mineral acids, like sulfonic acids, for example. A tin catalyst or other catalyst, such as used for curing a silane topcoat, has no effect on the basecoat curing. Curing of the basecoat is not promoted by tin, titanium or other Lewis acid catalysts used to cure the topcoat.

Additional film-forming and/or crosslinking polymers may be included in the basecoat or topcoat compositions employed in the present invention. Examples include conventionally known acrylics, cellulosics, aminoplasts, urethanes, polyesters, epoxides or mixtures thereof. One example of an additional optional acrylic polymer is an acrylic polyol solution polymer. Such polyols preferably have a hydroxyl number of about 50-200 and a weight average molecular weight of about 1,000-200,000 and preferably about 1,000-20,000. A preferred polyol is comprised by weight of 25% styrene, 31% butyl methacrylate, 17% butyl acrylate and 38% hydroxy propyl acrylate and has a Tg of 18.5° C.

In general, the composition of the basecoat is not limited by the present invention except to the extent that it must not be effectively cured or adversely affected to a substantial degree, by the presence of the curing catalyst for the topcoat. Preferred basecoats comprise a polyester or polyester urethane in combination with a melamine crosslinking agent and a polyol. Suitable polyols include acrylic, polyester, polyester urethane, or an acrylic urethane polyol having a hydroxy number of 60-160. Such polyols may contribute to recoat adhesion over a silane clearcoat by hydroxy groups on the polyol reacting with some of the unreacted or residual silane groups in the clearcoat even though the topcoat has substantially or partially cured.

p An example of a suitable basecoat, in addition to pigments, aluminum flakes, and UV absorber, comprises by weight of composition, about 25% microgel for rheology control, 21% melamine formaldeyde resin, 17% branched polyester resin, 3% acrylourethane having a hydroxy number of 120, 2% blocked dibutyl dodecyl benzyl sulfonic acid catalyst, and 2% dibutyl diacetate.

Although not wishing to be bound by theory, it is surmised that the presence of the silane cure catalyst in the preferred basecoat composition may cause the reaction of the hydroxy-functional resin in the basecoat with the alkoxysilane and/or silanol groups in the clearcoat to form Si-0-C bonds which promote adhesion between the original clearcoat and repair basecoat interface.

A variety of pigments and metallic flakes may be employed in the basecoat, as would be apparent to those skilled in the art. Typical pigments in the basecoat composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake, pearlescent flakes, and the like.

The pigments can be introduced into the coating composition by first forming a mill base or pigment dispersion with any of the aforementioned polymers used in the coating composition or with another compatable polymer or dispersant by conventional techniques, such as high speed mixing, sand grinding, ball milling, attritor grinding or two roll milling. The mill base is then blended with the other constituents used in the coating composition.

The compositions employed in the present invention may also include other conventional formulation additives such as flow control agents, for example, such as Resiflow ™ S (polybutylacrylate), BYK ™ 320 and 325 (high molecular weight polyacrylates); and rheology control agents, such as fumed silica.

Conventional solvents and diluents are used to disperse and/or dilute the above mentioned polymers. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

According to the present invention, any of the coating compositions can be applied by conventional techniques such as spraying, electrostatic spraying, dipping, brushing, flowcoating and the like. The preferred techniques are spraying and electrostatic spraying. After application, a coating composition is typically baked at 100-150° C. for about 15-30 minutes to form a coating about 0.1-3.0 mils thick. When a composition is used as a clearcoat, it is applied over the colorcoat which may be dried to a tack-free state and cured or preferably flash dried for a short period before the clearcoat is applied. The colorcoat/clearcoat finish may then be baked as mentioned above to provide a dried and cured finish.

It has become customary, particularly in the auto industry, to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated.

EXAMPLE 1

This example illustrates one embodiment of an organosilane polymer for a topcoat composition which may be employed in the present method. A solution of an organosilane polymer A is prepared by charging the following constituents into a polymerization reactor equipped with a heat source and a reflux condensor:

|  | Parts by Weight |
| --- | --- |
| Portion I |  |
| "Solvesso" 100 | 75.00 |
| Portion II |  |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III |  |
| 2,2-(2-methyl butane nitrile) | 57.32 |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 2

This example illustrates another silane polymer which may be employed in the present process. The following components are used in preparing an acrylosilane solution polymer by free radical polymerization.

|  | Parts by Weight |
|---|---|
| Portion I |  |
| "Solvesso" 100 | 726.4 g |
| Portion II |  |
| Methacryloxypropyltrimethoxy silane | 1380.3 g |
| Styrene | 500. g |
| Methyl methacrylate monomer | 424.7 g |
| 2-Ethylhexyl acrylate | 159.2 g |
| Butyl methacrylate monomer | 159.2 g |
| Hydrocarbon ("Napoleum" 145A) | 81.8 g |
| Portion III |  |
| "Lepensol" 70 | 70. g |
| Hydrocarbon ("Napoleum" 145A) | 199.3 g |
| Portion IV |  |
| Hydrocarbon ("Napoleum" 145A) | 27.2 g |
| Portion V |  |
| Hydrocarbon ("Napoleum" 145A) | 9.1 g |

Portion I, containing organic solvent, is charged to the reaction flask and heated to reflux. Portion II, containing the monomers for the acrylosilane polymer, and Portion III are added simultaneously. Portion II is added over a 6 hour period, and Portion III is added over a 7 hour period. After Portion II is added, Portion IV is added immediately. After Portion III is added, Portion V is added immediately. Heating is continued at reflux for one additional hour after all the portions have been added. The reaction mixture is then cooled and filtered.

EXAMPLE 3

This example illustrates one embodiment of a hydroxy functional non-aqueous sterically stabilized dispersed polymer, optionally included in a topcoat composition which may be employed in the present process. This polymer is prepared by charging the following components into a reactor:

|  | Parts by Weight |
|---|---|
| Portion I |  |
| Isopropanol | 179.26 |
| Acrylic polymer solution | 2254.05 |
| (52% solids of an acrylic polymer of 15% styrene, 28% butyl methacrylate, 30% butyl acrylate, 10% hydroxy ethyl acrylate, 2% acrylic acid and 15% ethyl methacrylate having a weight average molecular weight of 10,000 in a solvent mixture of 82.2% xylene and 17.8% butanol) |  |
| Mineral spirits | 255.65 |
| Heptane | 1912.46 |
| Portion II |  |
| Heptane | 28.75 |
| t-Butyl peroctoate | 4.68 |
| Portion III |  |
| Methyl methacrylate monomer | 1459.69 |
| Hydroxyethyl acrylate monomer | 784.81 |
| Styrene monomer | 156.97 |
| Portion IV |  |
| Acrylic polymer solution | 1126.52 |
| (53% solids of an acrylic polymer of 15% styrene, 28% butyl methacrylate, 30% butyl acrylate, 10% hydroxy ethyl acrylate, 2% acrylic acid and 15% ethyl methacrylate, 2.7% glycidyl methacrylate having a weight average molecular weight of 10,000 in a solvent mixture of 82.2% xylene and 17.8% butanol) |  |
| Methyl methacrylate monomer | 125.57 |
| Methyl acrylate monomer | 565.06 |
| Glycidyl methacrylate monomer | 47.05 |
| Heptane | 17.25 |
| Portion V |  |
| Mineral Spirits | 638.63 |
| t-Butyl peroctoate | 47.14 |
| Isobutanol | 127.31 |
| Portion VI |  |
| t-Butyl peroctoate | 30.96 |
| Isobutanol | 255.65 |
| Portion VII |  |
| Heptane | 167.25 |
| Total | 10,184.71 |

Portion I is charged into the reaction vessel and heated to its reflux temperature. Then Portion II is added to the reaction vessel mixed and held at reflux temperature for 2 minutes. Then Portions III and IV are added simultaneously with Portion V, over a 210 minute period, to the reaction vessel while maintaining the resulting reaction mixture at its reflux temperature. Then the mixture is held at its reflux temperature for an additional 45 minutes. Portion VI is added over a 90 minute period while maintaining the reaction mixture at its reflux temperature and then held at this temperature for an additional 90 minutes. Portion VII is added and excess solvent is stripped off to give a 60% solids dispersion.

The resulting polyester dispersed polymer has a core having a weight average molecular weight of about 100,000–200,000 and arms attached to the core having a weight average molecular weight of about 10,000–15,000.

EXAMPLE 4

This example illustrates an acrylic polyol resin solution, optionally included in the topcoat composition employed in the present process. This polymer is prepared by charging the following constituents into a polymerization reactor equipped with a heat source and a reflux condenser:

| | Parts by Weight |
|---|---|
| Portion I | |
| n-Pentyl propionate | 501.00 |
| Portion II | |
| Styrene | 360.00 |
| Isobutyl methacrylate | 696.00 |
| 2-Ethylhexyl acrylate | 480.00 |
| Hydroxypropyl acrylate | 864.00 |
| n-Pentylpropionate | 285.00 |
| Portion III | |
| t-Butyl peroctoate | 60.00 |
| n-Pentyl propionate | 60.00 |
| Total | 3306.00 |

Portion I is charged into the reactor and is heated to its reflux temperature of about (160-163° C.). Portions II and III are each premixed and then added simultaneously to the reactor while the reaction mixture is held at its reflux temperature. Portion II is added at a uniform rate over a 6 hour period and Portion III is added at a uniform rate over a 7 hour period. After Portion III is added, the reaction mixture is held at its reflux temperature for an additional hour. The resulting acrylic polyol resin solution is cooled at room temperature and filtered.

The resulting acrylic polyol resin solution is 70% by weight of polymer solids. The polymer has a weight average molecular weight of about 6,000 and a hydroxyl number of about 150-160. It constitutes the following: 15% styrene, 29% isobutyl methacrylate, 20% 2-ethylhexyl methacrylate, and 36% hydroxypropyl acrylate.

EXAMPLE 5

One embodiment of a coating composition useful in practicing the present process is prepared by blending together the following constituents:

| | Parts by Weight |
|---|---|
| Portion I | |
| Xylene | 163.00 |
| 2(3-hydroxy-3,5'-ditertamylphenyl amylphenyl) benzotriazole | 113.20 |
| Hindered amine U.V. light stabilizer solution (40% solution in xylene of 8-acetyl-3-dodecyl-7, 7, 9, 9-tetramethyl-2,3, 8-triazaspiro (4,5)-decane-2,4 dione) | 147.80 |
| Baysilon Oil Solution | 4.10 |
| (72.8 parts Baysilone Fluid OL and 655.2 parts xylene) | |
| Portion II | |
| Methylated/butylated melamine formaldehyde resin (fully butylated and methylated melamine formaldehyde resin having a butoxy/methoxy ratio of 1:1 and a degree of polymerization of about 1–1.2) | 2068.50 |
| Acrylic polyol resin solution | 4054.30 |
| Blocked sulfonic acid solution | 236.40 |
| (33% solids in methanol of dodecyl benzene sulfonic acid blocked with dimethyl oxazolidine, molar ratio of acid: dimethyl oxazolidine is 1.52:1) | |
| Dispersed polymer (prepared above) | 985.40 |
| Acrylosilane polymer solution A (prepared above) | 3439.00 |
| Portion III | |

-continued

| | Parts by Weight |
|---|---|
| Methanol | 203.80 |
| "Solvesso" 100 - hydrocarbon solvent | 458.50 |
| Total | 11,874.00 |

The constituents of Portion I are added in the order shown to a mixing vessel and agitated until solution is complete. Portion II is added to the vessel and mixed for 30 minutes. Portion III is added and mixed for 30 minutes. The resulting clear coating composition has 70% solids content.

EXAMPLE 6

This example illustrates another silane topcoat composition which may be employed in the present invention. This composition comprises a combination of a polyester urethane, melamine/formaldehyde resin, and an acrylosilane polymer. The following ingredients were mixed: Component Percent

| Component | Percent |
|---|---|
| polyester urethane | 42.63 |
| akylated melamine/formaldehyde resin (crosslinker) | 30.23 |
| silane functional acylic solution polymer | 27.14 |
| strong acid (block acid, curing catalyst) | 0.5 |
| ZW-8027 flow agent | 1.03 |
| Tinuvin 1130 light stabilizer | 0.33 |
| DS-1890 leveling agent | 0.25 |

The acrylosilane, in the above composition, was 50% styrene, 35% 3-methacryloxypropyltrimethoxy silane (A-174) from Union Carbide, 5% methyl methacrylate, 5% butyl methacrylate, and 5% 2-ethylhydroxy acrylate. The flow agent, a tetramethyl orthoformate, the light stabilizer, a substituted hydroxyphenol bentotriazole, and the leveling agent, a silicone oil, are all conventional, commercially available products. A solvent, ethylene glycol monobutyl ether, was employed to thin the composition to 35 sees. viscosity. The catalyst for curing silane functionality in the above composition is introduced into the basecoat composition which is cured by melamine crosslinking chemistry. The level of tin catalyst used is 1.5% on binder. The curing catalyst was dibutyl tin dilaurate.

Various modifications, alterations, additions or substitutions of the process of this invention will be apparent to those skilled in the art without departing form the scope and spirit of this invention and it should be understood that this invention is not limited to the illustrated embodiments set forth herein, but rather as recited in the following claims.

What is claimed is:

1. A method for in-line or end-of-line repair an automobile or truck during their original manufacture, having a cured basecoat/clearcoat finish in which the clearcoat comprises an organosilane polymer, which method comprises the steps of:
   (a) forming a repair basecoat by applying, over said clearcoat, a basecoat composition which is primarily non-silane containing but which comprises a silane curing catalyst;
   (b) forming a repair topcoat by applying wet on wet, over said repair basecoat, a clearcoat composition comprising an organosilane polymer; and
   (c) curing said repair topcoat and basecoat together.

2. The method of claim 1, wherein said organosilane polymer is a hydroxy or non-hydroxy functional acrylosilane interpolymer.

3. The method of claim 1, wherein said organosilane polymer is selected from the group consisting of polyesters, polyester urethanes, acrylics, or copolymers thereof, comprising reactive silicon-containing groups.

4. The method of claim 1, wherein said silane curing catalyst comprises an organo-metallic compound or chelate.

5. The method of claim 4, wherein said curing catalyst comprises tin, aluminum, titanium, or zirconium.

6. The method of claim 5, wherein said curing catalyst is selected from the group, consisting of a dialkyl metal diacid, dialkyl metal diacid, dialkyl metal halide, trialkyl or triaromatic boron, tetraalkyl metal, wherein said metal is tin, aluminum, titanium, or zirconium; said alkyl has 1 to 8 carbon atoms, said acid is an organic acid having 1 to 20 carbon atoms, and said aromatic has. 1 to 8 carbon atoms.

7. The method of claim 1, wherein said repair topcoat is applied to said repair basecoat wet-on-wet.

8. The method of claim 2, wherein said acrylosilane interpolymer is the reaction product of a mixture of monomers of which from about 5 to 70% by weight, based on the weight of the interpolymer, are ethylenically unsaturated monomers which contain a silane functionality.

9. The method of claim 1, wherein said repair basecoat composition contains about 0.1–5% by weight, based on the weight of the composition, of said catalyst.

10. The method of claim 1, wherein the basecoat is non-silane containing.

11. A substrate coated according to the method of claim 1.

12. A method for forming, during in-line or end-of-line repair of an automobile or truck, during their original manufacture, a second basecoat and clearcoat finish over a first basecoat and clearcoat finish, which method comprises the steps of:

(a) forming a second basecoat by applying, over said first clearcoat and basecoat, a basecoat composition which is primarily non-silane containing but which comprises a silane curing catalyst and, before fully drying or curing of said second basecoat has occurred, (b) forming a second clearcoat by applying, over said second basecoat, a clearcoat composition comprising a silane functional polymer, wherein said compositions used to form said second basecoat and clearcoat are the same compositions that were used to form the first basecoat and topcoat, respectfully; and (c) curing the second basecoat and clearcoat together.

13. The method of claim 14, wherein said silane curing catalyst comprises at least one organo-metallic compound or chelate.

* * * * *